US009092979B2

(12) United States Patent
Burry et al.

(10) Patent No.: US 9,092,979 B2
(45) Date of Patent: Jul. 28, 2015

(54) AUTOMATED LICENSE PLATE RECOGNITION SYSTEM AND METHOD USING HUMAN-IN-THE-LOOP BASED ADAPTIVE LEARNING

(75) Inventors: Aaron M. Burry, Ontario, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 873 days.

(21) Appl. No.: 12/967,760

(22) Filed: Dec. 14, 2010

(65) Prior Publication Data

US 2012/0148105 A1 Jun. 14, 2012

(51) Int. Cl.
*G06K 9/00* (2006.01)
*G08G 1/017* (2006.01)
*G06K 9/03* (2006.01)

(52) U.S. Cl.
CPC ............. *G08G 1/0175* (2013.01); *G06K 9/033* (2013.01); *G06K 2209/15* (2013.01)

(58) Field of Classification Search
USPC ......... 382/103, 105, 155, 159, 161, 173, 176, 382/177
See application file for complete search history.

(56) References Cited

U.S. PATENT DOCUMENTS

| | | | |
|---|---|---|---|
| 6,295,387 B1 | 9/2001 | Burch | |
| 6,339,651 B1 * | 1/2002 | Tian et al. | 382/105 |
| 6,351,574 B1 | 2/2002 | Yair et al. | |
| 6,771,819 B2 * | 8/2004 | DeYong et al. | 382/228 |
| 7,095,892 B2 | 8/2006 | Lee et al. | 382/182 |
| 7,382,280 B2 | 6/2008 | Long | 340/937 |
| 7,504,965 B1 | 3/2009 | Windover et al. | 340/937 |
| 7,711,150 B2 | 5/2010 | Simon | 382/105 |
| 8,447,112 B2 * | 5/2013 | Paul et al. | 382/182 |
| 2008/0031522 A1 | 2/2008 | Axemo et al. | |
| 2008/0118110 A1 | 5/2008 | Simonsson | |
| 2009/0208060 A1 | 8/2009 | Wang et al. | 382/105 |
| 2010/0052947 A1 | 3/2010 | Lin et al. | 340/932.2 |

FOREIGN PATENT DOCUMENTS

WO WO 2010107411 A1 * 9/2010 ................ G06T 5/00

OTHER PUBLICATIONS

GB Search Report for GB112125.1 dated Mar. 29, 2012.

* cited by examiner

*Primary Examiner* — Vikkram Bali
(74) *Attorney, Agent, or Firm* — Luis M. Ortiz; Kermit D. Lopez; Kevin Soules (57) ABSTRACT

An automated license plate recognition (ALPR) system and method using a human-in-the-loop based adaptive learning approach. One or more images with respect to an automotive vehicle can be segmented in order to determine a license plate of the automotive vehicle within a scene. An optical character recognition (OCR) engine loaded with an OCR algorithm can be further adapted to determine a character sequence of the license plate based on a training data set. A confidence level with respect to the images can be generated in order to route a low confidence image to an operator for obtaining a human interpreted image. The parameters with respect to the OCR algorithm can be adjusted based on the human interpreted image and the actual image of the license plate. A license plate design can be then incorporated into the OCR engine in order to automate the process of recognizing the license plate with respect to the automotive vehicle in a wide range of transportation related applications.

20 Claims, 6 Drawing Sheets

AUTOMATED LICENSE PLATE RECOGNITION SYSTEM AND METHOD USING HUMAN-IN-THE-LOOP BASED ADAPTIVE LEARNING

TECHNICAL FIELD

Embodiments are generally related to recognition algorithms and recognition methods and systems. Embodiments also relate to automated license plate recognition methods and systems. Embodiments are further related to OCR (Optical Character Recognition) techniques. Embodiments are additionally related to methods and systems for automatically recognizing a license plate located on an automotive vehicle.

BACKGROUND OF THE INVENTION

Automated license plate recognition (ALPR) is a mass surveillance method that uses optical character recognition on an image to read a license plate on a vehicle. ALPR is a critical technology for many transportation related solutions such as, for example, red light photo-enforcement and automated tolling systems. ALPR automatically determines the character sequence on the license plate and provides a ticket and/or toll charge with respect to an individual person and/or account. Such transportation solutions typically utilize a digital photograph and/or one or more still shots from a video in order to analyze the license plate of the vehicle.

Most prior art ALPR systems adapt an optical character recognition (OCR) approach to determine the character sequence on the license plate of the automotive vehicle, which could be travelling at high speeds. Such prior art systems perform optical character recognition on the images of the license plate via a supervised learning approach in presence of a number of noise factors. The noise factors associated with the images include for example, various font types and sizes, various jurisdictions, lighting variations, plate mounting variations including plate frame occlusion, weather, plate damage, and plate contamination. In addition to the OCR technique, the prior art ALPR solutions calculate a confidence level on a decoded output in order to ensure accuracy and direct the low confidence images to an operator for manual interpretation.

Figure 1:
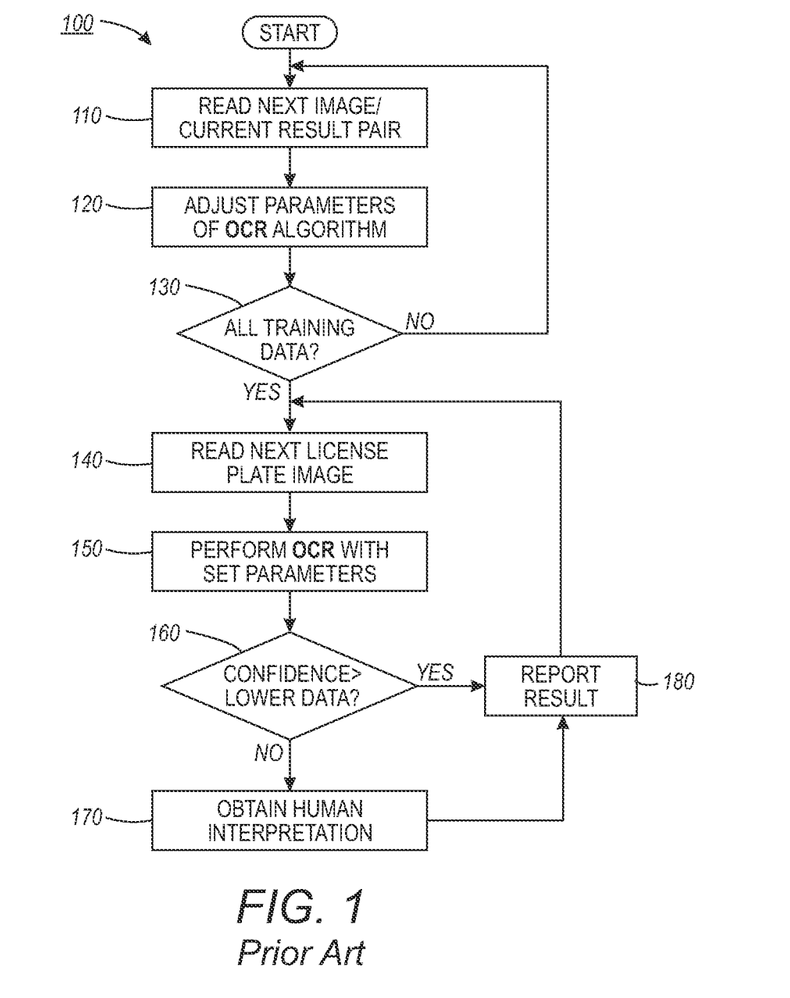
FIG. 1 illustrates a prior art method for recognizing a license plate with respect to a automotive vehicle.

FIG. 1 illustrates a detailed flow chart of operations illustrating logical operational steps of a prior art method 100 for recognizing images in a license plate of an automotive vehicle based on a supervised learning approach. An image/current result pair with respect to the automotive vehicle can be read, as illustrated at block 110. The parameters associated with the OCR algorithm can be adjusted based on the image/current result pair, as indicated at block 120. A determination can be made whether all the training data sets have been used to adjust the parameters of the OCR algorithm, as depicted at block 130. If all the training data sets have been utilized, the next test license plate image can be read, as illustrated at block 140. Otherwise, the process continues from block 110 to adjust OCR parameters based on training data. Furthermore, the optical character recognition can be performed on the next test license plate image with respect to the set of parameters, as indicated at block 150. A determination can be made whether the confidence level is greater than a lower limit, as illustrated at block 160. If the confidence level is greater than the lower limit, the results can be reported and the process continued from block 140, as depicted at block 180. Otherwise, the human interpretations with respect to the images can be obtained and the process can be continued from block 180, as illustrated at block 170. Here, a test license plate image refers to a license plate image not in the training data set.

An OCR engine associated with the ALPR employs the training data sets, such as a set of sample images and correct interpretations with respect to the automotive vehicle, for identifying the letters and numbers in the images of the license plate. Upon obtaining the initial training data set, the OCR engine can be applied to a larger data set for identifying the images in a real-time application. In such real time applications, the images presented to the OCR engine can include a wider variety of variations than in the training data set due to the noise factors. Alternatively, the breadth of the image variation in the training data set can be increased, which also increases the size of the training data set and the amount of time and cost of training. However, the prior art approaches are unable to provide recognition with high confidence nor calculate a sufficient confidence level with respect to the images based on the training data set with such added image variation. Furthermore, such manual approaches for interpreting the images with respect to the automotive vehicle and the license plate is costly, time consuming and prone to errors.

Based on the foregoing it is believed that a need exists for an improved automated license plate recognition system and method. A need also exists for an improved method for automating license plate recognition utilizing a human-in-the-loop based adaptive learning approach, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved automated license plate recognition (ALPR) system and method.

It is another aspect of the disclosed embodiments to provide for an improved human-in-the-loop based adaptive learning approach.

It is a further aspect of the disclosed embodiments to provide for an improved method for automatically recognizing a license plate located on an automotive vehicle using the human-in-the-loop based adaptive learning approach.

The aforementioned aspects and other objectives and advantages can now be achieved as described herein. An automated license plate recognition (ALPR) system and method using the human-in-the-loop based adaptive learning approach is disclosed herein. One or more images with respect to an automotive vehicle can be segmented in order to determine a license plate of the automotive vehicle within a scene. An optical character recognition (OCR) engine loaded with an OCR algorithm can be adapted to determine a character sequence of the license plate based on a training data set. A confidence level with respect to the images can be generated in order to route a low confidence image to an operator for obtaining a human interpreted character sequence. The parameters with respect to the OCR algorithm can be adjusted based on the human interpreted character sequence and the actual image of the license plate. A license plate design can then be incorporated into the OCR engine in order to automate the process of recognizing the license plate with respect to the automotive vehicle in a wide range of transportation related applications.

Applying a filtering approach and/or other noise reduction and de-blurring technique associated with an image-processing unit of the ALPR system can process the images with respect to the automotive vehicle. Actual license plates can be captured with an imaging system and manually interpreted to provide an adequate training data set with respect to the OCR engine. The confidence level with respect to the images can be based on a signal-to-noise ratio in the image and other image artifact quantifications, as well as the ambiguity with respect to another license plate character sequence. The parameters of the embedded OCR algorithm can be adjusted within the workflow in order to incorporate the human interpreted images into the training data set of the OCR engine. The adjusted parameters with respect to the human interpreted images can be applied in a wide range of recognition approaches such as, support vector machine methods, pattern classification, Bayesian decision methods, neural network classifiers, fuzzy logic decision making and genetic algorithm based optimizers, etc. Such an approach effectively yields a significant reduction in the labor cost for manual interpretations on the license plate images with respect to the ALPR system.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 2:
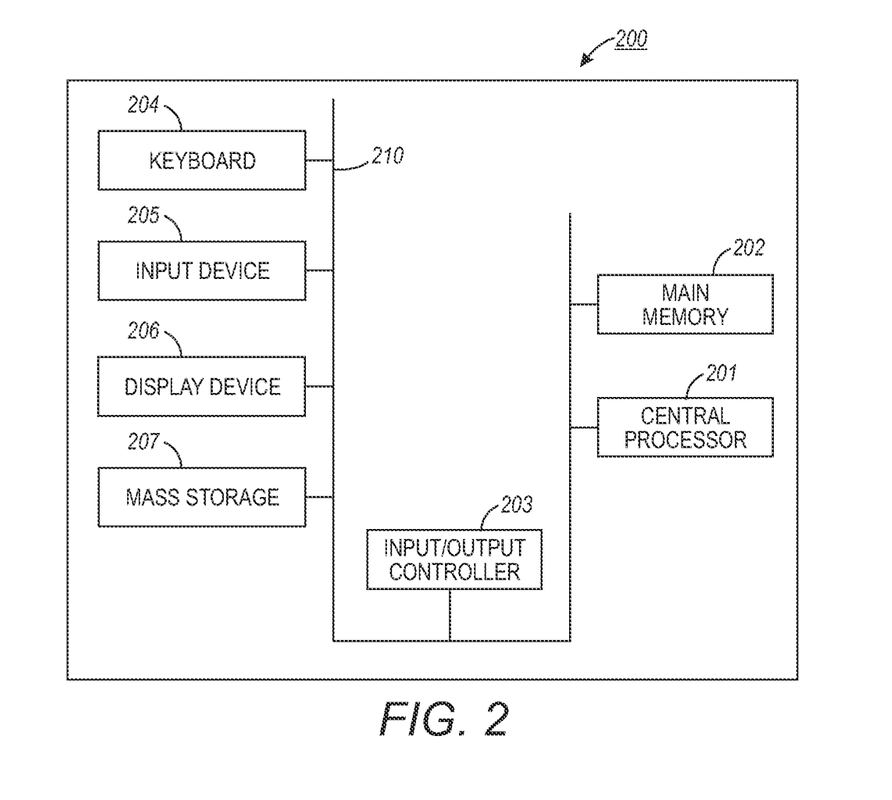
FIG. 2 illustrates a schematic view of a computer system, in accordance with the disclosed embodiments.
Figure 3:
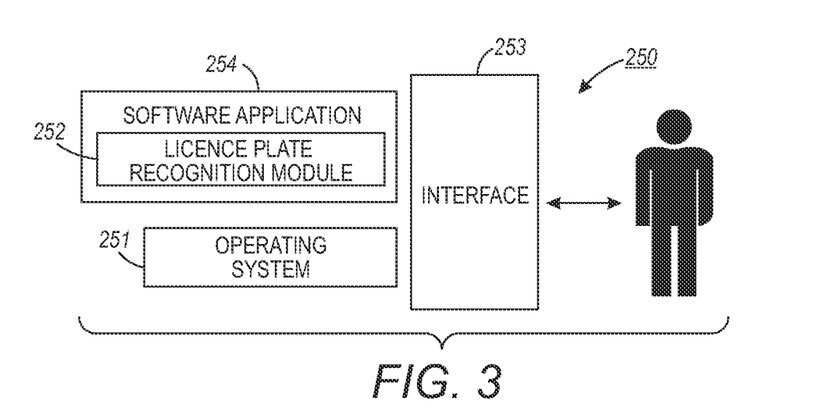
FIG. 3 illustrates a schematic view of a software system including a license plate recognition module, an operating system, and a user interface, in accordance with the disclosed embodiments.

FIGS. 2-3 are provided as exemplary diagrams of data-processing environments in which embodiments of the present invention may be implemented. It should be appreciated that FIGS. 2-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 2, the disclosed embodiments may be implemented in the context of a data-processing system 200 that includes, for example, a central processor 201, a main memory 202, an input/output controller 203, and a mass storage 207 (e.g., a hard disk). Additional input/output devices such as, a keyboard 204, an input device 205 (e.g., a pointing device, such as a mouse, track ball, pen device, etc), and a display device 206 may be associated with the data-processing system 200 as desired. As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc.

FIG. 3 illustrates a computer software system 250 for directing the operation of the data-processing system 200 depicted in FIG. 2. Software application 254, stored in main memory 202 and on mass storage 207, generally includes a kernel or operating system 251 and a shell or interface 253. One or more application programs, such as software application 254, may be "loaded" (i.e., transferred from mass storage 207 into the main memory 202) for execution by the data-processing system 200. The data-processing system 200 receives user commands and data through user interface 253; these inputs may then be acted upon by the data-processing system 200 in accordance with instructions from operating system module 251 and/or software application 254.

Note that as utilized the term "operating system" with respect to operating system 251 refers generally to software (e.g. software module or modules), that are composed of programs and data, and which runs on one or more data-processing systems (e.g., data-processing system 200) and manages computer hardware and provides common services for efficient execution of various application software. For hardware functions such as input and output and memory allocation, the operating system 251 can function as an intermediary between application programs and the computer hardware, although the application code is usually executed directly by the hardware, but will frequently call the operating system 251 or be interrupted by it. Operating systems are found on almost any device that contains a computer—from cellular phones and video game consoles to supercomputers and web servers. Examples of popular modern operating systems for personal computers are Microsoft Windows, Mac OS X, and GNU/Linux.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 253, which is preferably a graphical user interface (GUI), can serve to display results, whereupon a user may supply additional inputs or terminate a particular session. In some embodiments, operating system 251 and interface 253 can be implemented in the context of a "Windows" system. It can be appreciated, of course, that other types of systems are possible. For example, rather than a traditional "Windows" system, other operation systems, such as, for example, a Real Time Operating System (RTOS) more commonly employed in wireless systems may also be employed with respect to operating system 251 and interface 253. The software application 254 can include, for example, a license plate recognition module 252 for automating recognition of a license plate with respect to an automotive vehicle travelling at high speeds. The license plate recognition module 252 can include instructions, such as those of method 400 and 500 discussed herein with respect to FIGS. 6-7.

FIGS. 2-3 are thus intended as an example, and not as an architectural limitation with respect to particular embodiments. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms, including Macintosh, UNIX, LINUX, and the like.

Figure 4:
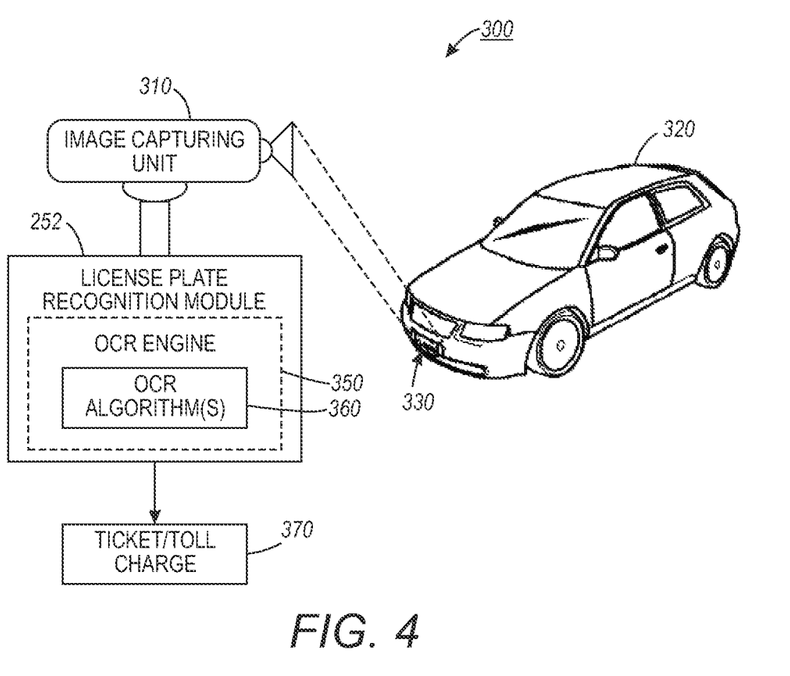
FIG. 4 illustrates a perspective view of an automated license plate recognition (ALPR) system based on a human-in-the-loop based adaptive learning, in accordance with the disclosed embodiments.

FIG. 4 illustrates a perspective view of an automated license plate recognition (ALPR) system 300, in accordance with the disclosed embodiments. Note that in FIGS. 1-7 identical parts or elements are generally indicated by identical reference numerals. The ALPR system 300 generally adapts an optical character recognition (OCR) technique to read a license plate 330 of an automotive vehicle 320 in a wide range of transportation solution related applications such as an electronic toll collection on pay-per-use roads, monitoring traffic activity, and red light adherence in an intersection. The system 300 recognizes the characters of the license plate 330 based on a human-in-the-loop based adaptive learning approach.

The system 300 generally includes an image-capturing unit 310 that is operatively configured in association with the license plate recognition module 252 for capturing the images with respect to the automotive vehicle 320 within the field of view of the image-processing unit 310. The image-capturing unit 310 can be configured to utilize an imaging modality of visible light monochrome, visible light color, near infrared, short wave infrared, or long wave infrared. In some embodiments, the image-processing unit 310 can be configured as, for example, a camera whose detection characteristics are at least one of: visible light monochrome, visible light color, near infrared, short wave infrared, and long wave infrared.

The image-processing unit 310 can in various embodiments capture the image of the license plate 330 while the automotive vehicle 320 is in motion, or in a stationary environment. The image-capturing unit 310 may include built-in integrated functions such as image processing, data formatting and data compression functions. Additionally, the image-capturing unit 310 includes image positioning, range-finding and a flash bulb. The image-processing unit 310 further provides an output signal indicative of the identified license plate 330 with respect to the license plate recognition module 252. Note the image of the license plate 330 can be, for example, an image of a portion of a license plate corresponding to, for example, one character.

The license plate recognition module 252 further includes an OCR engine 350 having one or more OCR algorithms 360 for translating the captured images in the image processing unit 310 into a standard encoding scheme representing the translated characters for example, an ASCII or Unicode. Note that the OCR engine 350 described herein includes a technique for character recognition that employs an image-processing means to identify the graphic characters with respect to the license plate 330.

The OCR engine 350 extracts the registration numbers of the automotive vehicles 320 based on the images of the license plate 330. The OCR engine 350 receives the data packets comprising images representative of the license plate 330 (e.g., a front license plate and/or a rear license plate of the automotive vehicle 320). The OCR engine 350 further describes the syntax of a license number of the license plate 330, identifies the characters within the license plate 330 based on the syntax detailed within a standard template, and derives a confidence level based on the identified characters within the license plate 330. Note that the template described herein details the syntax of the data to be identified for example, the correct syntax of an automotive vehicle registration number, an employee serial number, and/or any other data, which may be captured from the license plate 330.

The confidence level with respect to the images of the license plate 330 can be utilized to accurately determine the license plate number of the automotive vehicle 320 based on a signal-to-noise ratio in the image and other image artifact quantifications. The confidence level can also be determined based on how ambiguous the automatically determined license plate character sequence is with respect to another character sequence, that is the distance to the next closest candidate alternate character sequence. If a particular image produces a plate number with a low confidence, such an image is routed to an operator (e.g., human) for manual interpretation in order to determine the plate number. The low confidence images typically include an artifact that the automated system 300 cannot handle. Since the human operator interprets the low confidence images, the correct results for the images are then incorporated into the OCR engine 350 for further enhancement of the ability of automatically recognizing the license plate 330 in the ALPR system 300.

The confidence level with respect to the image in the OCR engine 350 thereby facilitates to adjust the parameters 365 of the OCR algorithm 360 based on the manual interpretation with respect to the image of the license plate 330. The ALPR system 300 performs the character recognition of the license plate 330 of the automotive vehicle 320 in the presence of varying noise factors such as, font types and sizes, various jurisdictions, lighting variations, plate mounting variations including plate frame occlusion, weather, plate damage, and plate contamination. Such character recognition of the license plate 330 can be performed to provide a toll charge/ticket 370 with respect to an individual and/or account.

Figure 5:
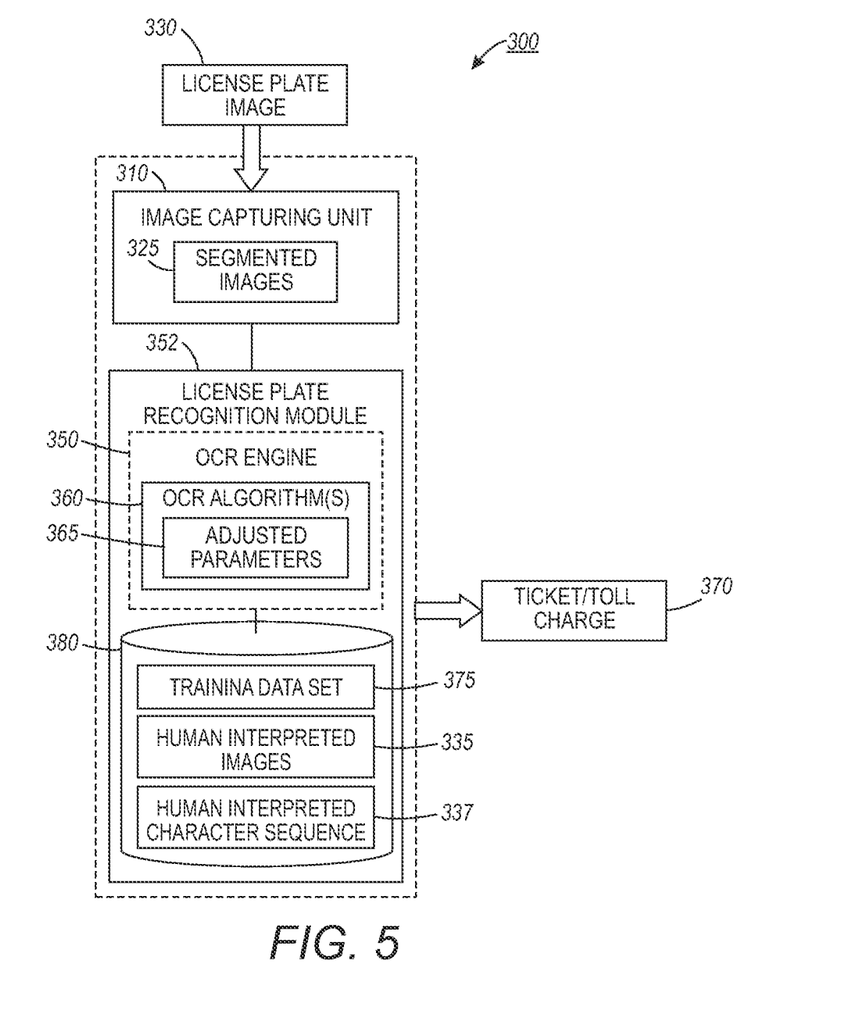
FIG. 5 illustrates a block diagram of the ALPR system, in accordance with the disclosed embodiments.

FIG. 5 illustrates a block diagram of the ALPR system 300, in accordance with the disclosed embodiments. The image-processing unit 310 segments the images of the automotive vehicle 320 for determining the license plate 330 of the automotive vehicle 320 within a scene. Applying a filtering approach and/or other noise reduction and de-blurring approaches associated with the image-processing unit 310 of the ALPR system 300 can process the images of the automotive vehicle 320. The optical character recognition (OCR) engine 350 loaded with the OCR algorithm 360 determines the character sequence of the license plate 330 based on a training data set 375 stored in a database 380 of the ALPR system 300.

The OCR engine 350 further generates the confidence level with respect to the images in order to route the low confidence image to an operator for obtaining a human interpreted image 335. Note that the confidence level with respect to the images of the license plate 330 can be defined based on a signal-to-noise ratio in the image and other image artifact quantifications, as well as the ambiguity of the automatically interpreted character sequence with respect to another character sequence. The human interpreted images 335 can be further stored into the database 380 of the system 300. The parameters 365 associated with the OCR algorithm 360 can be adjusted, for example, based on a human interpreted character sequence 337 and the actual image of the license plate 330.

The parameters 365 of the OCR algorithm 360 are adjusted within the workflow in order to incorporate the human interpreted character sequences 335 into the training data set 375 of the OCR engine 350. The adjusted parameters 365 based on the human interpreted character sequences can be the training parameters in a wide range of recognition approaches such as support vector machine methods, pattern classification, Bayesian decision methods, neural network classifiers, fuzzy logic decision making and genetic algorithm based optimizers, etc. A new set of parameter values 365 can then be incorporated into the OCR engine 350 in order to automate the process of recognizing the license plate 330 with respect to the automotive vehicle 320 in a wide range of transportation related applications.

Figure 6:
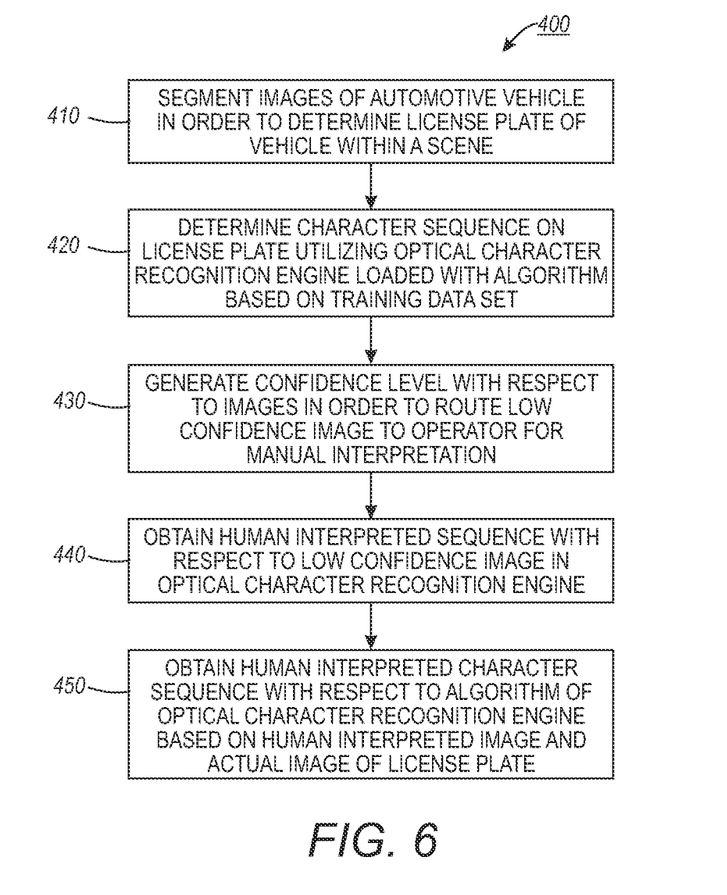
FIG. 6 illustrates a high level flow chart of operation illustrating logical operational steps of a method for automatically recognizing a license plate of an automotive vehicle based on a human-in-the-loop based adaptive learning approach, in accordance with the disclosed embodiments.

FIG. 6 illustrates a high level flow chart of operation illustrating logical operational steps of a method 400 for automatically recognizing the license plate 330 with respect to the automotive vehicle 320, in accordance with the disclosed embodiments. Note that the method 400 can be implemented in the context of a computer-useable medium that contains a program product, including, for example, a module or group of modules. The method 400 can be implemented utilizing the human-in-the-loop based adaptive learning technique in order to automatically recognize the license plate 330 located on the automotive vehicle 320. The images with respect to the automotive vehicle 320 can be segmented in order to obtain the image segments 325, as illustrated at block 410. Again as a reminder, the images of the automotive vehicle 320 can be processed utilizing the filtering and other noise reduction and de-blurring approaches associated with the image-processing unit 310.

The character sequence on the license plate 330 can be determined utilizing the OCR engine 350 loaded with the OCR algorithm 360 based on the training data set 375 stored in the database 380, as indicated at block 420. The confidence level with respect the images can be generated in order to route the low confidence images to the operator (e.g., human) for manual interpretation, as depicted at block 430. The human interpreted character sequences 335 with respect to the low confidence images can be generated based on the manual interpretations, as illustrated at block 440. The parameters 365 of the embedded OCR algorithms 360 can be further adjusted based on the results of the human interpreted character sequences 335 and actual images of the license plate 330, as depicted at block 450. The new parameter values 365 can be incorporated into the OCR engine 350 in order to automate the process of recognizing the license plate 330 of the automotive vehicle 320 in a wide range of transportation related applications.

Figure 7:
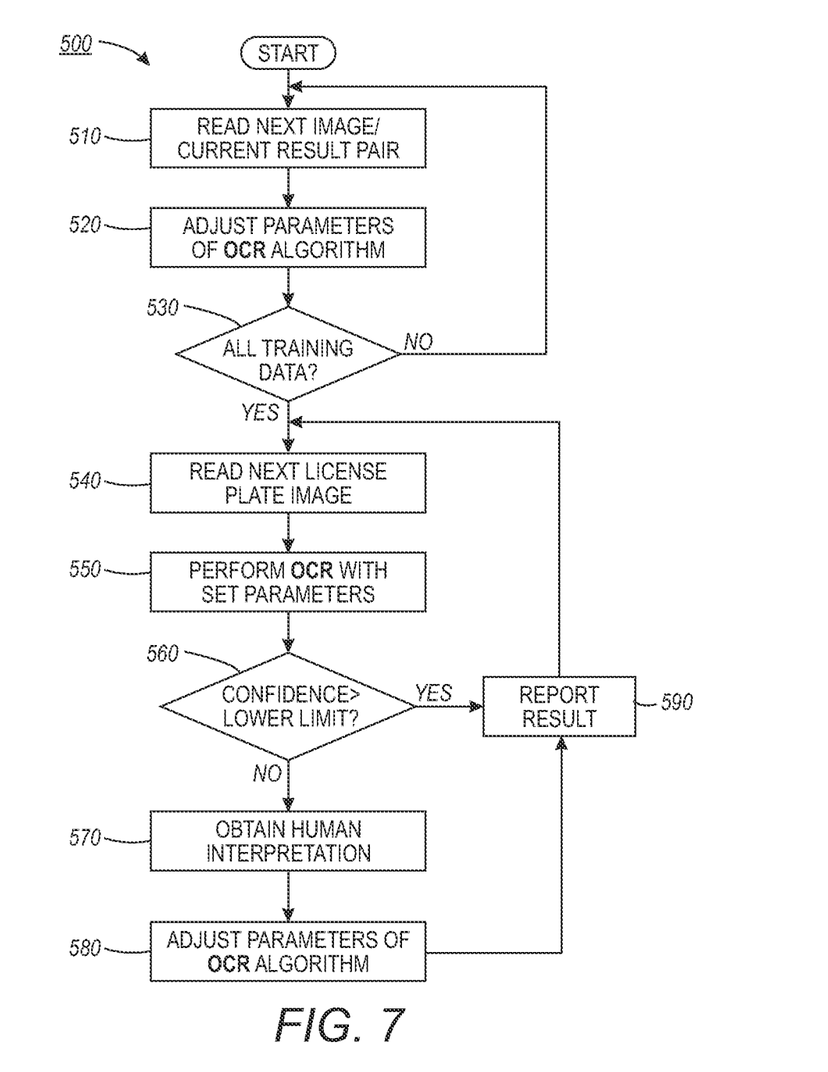
FIG. 7 illustrates a detailed flow chart of operation illustrating logical operational steps of a method for automatically recognizing the license plate of the automotive vehicle, in accordance with the disclosed embodiments.

FIG. 7 illustrates a detailed flow chart of operation illustrating logical operational steps of a method 500 for automatically recognizing the license plate 330 with respect to the automotive vehicle 320 based on the human-in-the-loop based adaptive learning approach, in accordance with the disclosed embodiments. The image/correct result pair with respect to the automotive vehicle 320 can be read, as illustrated at block 510. The parameters 365 associated with the OCR algorithm 360 can be adjusted with respect to the images and correct result pairs, as indicated at block 520. A determination can be made whether all the training data sets 375 have been used in training, as indicated at block 530. If all the training data sets 375 have been used, the next test license plate image 330 can be read, as illustrated at block 540. Otherwise, continue training the system from block 510. Further, the optical character recognition can be performed with respect to the set parameters 365, as depicted at block 550. A test license plate image is an image not in the training set.

A determination can be made whether the confidence level is greater than a lower limit, as illustrated at block 560. If the confidence level is greater than the lower limit, the results with respect to the image can be reported and the process continued from block 540, as depicted at block 590. Otherwise, the human interpreted character sequences 335 with respect to the license plate 330 are obtained, as illustrated at block 570. The parameters 365 with respect to the OCR algorithm 360 can be adjusted 580 and the process continues, as illustrated at block 590. Such a system and method therefore effectively yields a significant reduction in the labor cost with respect to manual interpretations of license plate images in an ALPR system across a wide range of transportation applications.

Note that the OCR algorithm 360 described herein is one type of a recognition algorithm that can be employed with the disclosed methods and systems. It can be appreciated that other types of recognition algorithms can be utilized in place of the OCR algorithm 360. In general, the recognition algorithm described herein can process correlation comparisons relative to a reference database and can also, in some embodiments, include the use of nearest distance measurements. The recognition algorithm described herein can also be configured to include the use of comparisons (as opposed to correlation comparisons) relative the disclosed reference database. Such comparisons can include data, for example, that include the use of correlation or nearest neighbor distance measurement techniques.

Note that in some embodiments, the human interpreted license plate character sequence and the license plate image segmented from one or more images of the automotive vehicle can be added to the disclosed reference database. Additionally, one or more images of the automotive vehicle can be obtained utilizing a camera whose detection characteristics are at least one visible light monochrome, visible light color, near infrared, short wave infrared, and long wave infrared. Also, the license plate image discussed herein can be an image of a portion of a license plate corresponding to, for example, one character.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for automatically recognizing a license plate character sequence of a license plate of an automotive vehicle, said method comprising:
   training a recognition algorithm associated with a license plate optical character recognition engine by adjusting recognition algorithm parameters based on a training data set comprising variations in training data license plate images and corresponding training data ground truth license plate character sequences;
   segmenting at least one image of an automotive vehicle to determine a license plate image of a license plate located on said automotive vehicle within a scene;
   determining an automatically recognized license plate character sequence in said license plate image utilizing said license plate optical character recognition engine;
   generating a confidence level for said automatically recognized license plate character sequence with respect to said license plate image, wherein said confidence level is based on a signal-to-noise ratio in said license plate image and other image artifact quantifications;
   comparing said confidence level to a lower limit;
   routing said license plate image to a human operator if said confidence level is below said lower limit;
   obtaining a human interpreted license plate character sequence from a human operator after said human operator examines said license plate image; and
   adjusting at least one parameter of said recognition algorithm associated with said license plate optical character recognition engine based on said human interpreted license plate character sequence and said license plate image in order to automatically recognize said license plate character sequence of said license plate of said automotive vehicle in a wide range of transportation applications.

2. The method of claim 1 wherein said at least one image of said automotive vehicle contains a license plate with a license plate design differing from the license plate designs of said training data license plate images within said training data set.

3. The method of claim 1 further comprising adjusting said at least one parameter of said algorithm in a workflow to incorporate said human interpreted license plate character sequence and said image of said license plate into a training data set of said optical character recognition engine.

4. The method of claim 1 further comprising processing said at least one image of said automotive vehicle by applying a filtering approach associated with said image processing unit.

5. The method of claim 1 further comprising processing said at least one image of said automotive vehicle by applying a noise reduction and deblurring approach associated with said image processing unit.

6. The method of claim 1 further comprising generating said confidence level of said automatically recognized license plate character sequence based on a distance between at least one alternate license plate character sequence.

7. The method of claim 2 wherein said different license plate design is the license plate design of a different state.

8. The method of claim 1 wherein said at least one image of said automotive vehicle is obtained under at least one of lighting, vibration, and weather conditions differing from image capture conditions associated with said training data license plate images within said training data set.

9. The method of claim 1 wherein said license plate image segmented from said at least one image of said automotive vehicle contains at least one of blur, contrast, rotation, and scale image characteristics differing from said training data license plate images within said training data set.

10. The method of claim 1 wherein said license plate image segmented from said at least one image of said automotive vehicle contains occlusion characteristics differing from said training data license plate images within said training data set.

11. The method of claim 1 wherein said recognition algorithm further comprises correlation comparisons relative to at least one of the following:
   a reference database; and
   data indicative of nearest neighbor distance measures.

12. The method of claim 11 wherein said human interpreted license plate character sequence and said license plate image segmented from said at least one image of said automotive vehicle are added to said reference database.

13. The method of claim 1 wherein said at least one image of said automotive vehicle is obtained using a camera whose detection characteristics are at least one of: visible light monochrome, visible light color, near infrared, short wave infrared, and long wave infrared.

14. The method of claim 1 wherein said license plate image comprises an image of a portion of a license plate corresponding to one character.

15. A system for automatically recognizing a license plate character sequence of a license plate of an automotive vehicle, said system comprising:
   a processor;
   a data bus coupled to said processor; and
   a computer-usable medium embodying computer code, said computer-usable medium being coupled to said data bus, said computer program code comprising instructions executable by said processor and configured for:
      training a recognition algorithm associated with a license plate optical character recognition engine by adjusting recognition algorithm parameters based on a training data set comprising variations in training data license plate images and corresponding training data ground truth license plate character sequences;
      segmenting at least one image of an automotive vehicle to determine a license plate image of a license plate located on said automotive vehicle within a scene;
      determining an automatically recognized license plate character sequence in said license plate image utilizing said license plate optical character recognition engine;
      generating a confidence level for said automatically recognized license plate character sequence with respect to said license plate image, wherein said confidence level is based on a signal-to-noise ratio in said license plate image and other image artifact quantifications;
      comparing said confidence level to a lower limit;
      routing said license plate image to a human operator if said confidence level is below said lower limit;
      obtaining a human interpreted license plate character sequence from a human operator after said human operator examines said license plate image; and
      adjusting at least one parameter of said recognition algorithm associated with said license plate optical character recognition engine based on said human interpreted license plate character sequence and said license plate image in order to automatically recognize said license plate character sequence of said license plate of said automotive vehicle in a wide range of transportation applications.

16. The system of claim 15 wherein said at least one image of said automotive vehicle contains a license plate with a license plate design differing from the license plate designs of said training data license plate images within said training data set.

17. The system of claim 15 wherein said instructions are further configured for adjusting said at least one parameter of said algorithm in a workflow to incorporate said human interpreted license plate character sequence and said image of said license plate into a training data set of said optical character recognition engine.

18. The system of claim 15 wherein said instructions are further configured for processing said at least one image of said automotive vehicle by applying a filtering approach associated with said image processing unit.

19. The system of claim 15 wherein said instructions are further configured for processing said at least one image of said automotive vehicle by applying a noise reduction and deblurring approach associated with said image processing unit.

20. A system for automatically recognizing a license plate character sequence of a license plate of an automotive vehicle, said system comprising:
  a processor;
  a data bus coupled to said processor; and
  a computer-usable medium embodying computer code, said computer-usable medium being coupled to said data bus, said computer program code comprising instructions executable by said processor and configured for:
  training a recognition algorithm associated with a license plate optical character recognition engine by adjusting recognition algorithm parameters based on a training data set comprising variations in training data license plate images and corresponding training data ground truth license plate character sequences;
  segmenting at least one image of an automotive vehicle to determine a license plate image of a license plate located on said automotive vehicle within a scene;
  generating a confidence level for said automatically recognized license plate character sequence with respect to said license plate image, wherein said confidence level is based on a signal-to-noise ratio in said license plate image and other image artifact quantifications;
  determining an automatically recognized license plate character sequence in said license plate image utilizing said license plate optical character recognition engine; and
  adjusting at least one parameter of said recognition algorithm associated with said license plate optical character recognition engine based on a human interpreted license plate character sequence and said license plate image in order to automatically recognize said license plate character sequence of said license plate of said automotive vehicle in a wide range of transportation applications.

* * * * *